(12) United States Patent
Tamura

(10) Patent No.: US 8,014,758 B2
(45) Date of Patent: Sep. 6, 2011

(54) MOBILE TELEPHONE APPARATUS WITH REMOTE ACCESS FUNCTION FOR EXTERNAL NETWORK AND REMOTE ACCESS METHOD FOR MOBILE COMMUNICATION SYSTEM

(75) Inventor: Noriko Tamura, Minato-ku (JP)

(73) Assignee: NEC Corporation, Tokyo (JP)

(*) Notice: Subject to any disclaimer, the term of this patent is extended or adjusted under 35 U.S.C. 154(b) by 305 days.

(21) Appl. No.: 12/266,849

(22) Filed: Nov. 7, 2008

(65) Prior Publication Data

US 2009/0069039 A1     Mar. 12, 2009

Related U.S. Application Data

(62) Division of application No. 11/671,721, filed on Feb. 6, 2007, now abandoned, which is a division of application No. 10/649,717, filed on Aug. 28, 2003, now abandoned.

(30) Foreign Application Priority Data

Sep. 4, 2002   (JP) .................................. 2002-258361

(51) Int. Cl.
    *H04L 12/58*   (2006.01)
    *H04M 1/725*   (2006.01)
(52) U.S. Cl. ..................... 455/412.1; 455/410; 455/411; 455/412.2; 455/414.1; 455/455

(58) Field of Classification Search .................. 455/410, 455/411, 412.1, 412.2, 414.1, 466
See application file for complete search history.

(56) References Cited

U.S. PATENT DOCUMENTS

| | | | |
|---|---|---|---|
| 5,889,958 A * | 3/1999 | Willens | ......................... 709/229 |
| 6,292,833 B1 | 9/2001 | Liao et al. | |
| 6,470,190 B2 | 10/2002 | Karhu | |
| 6,968,364 B1 | 11/2005 | Wong et al. | |
| 7,310,816 B1 | 12/2007 | Burns et al. | |
| 2002/0044149 A1 | 4/2002 | McCarthy et al. | |
| 2003/0114190 A1 | 6/2003 | Want et al. | |
| 2003/0153328 A1 | 8/2003 | Booth et al. | |
| 2004/0198448 A1 | 10/2004 | Cannon et al. | |
| 2004/0204070 A1 | 10/2004 | August et al. | |

FOREIGN PATENT DOCUMENTS

| | | | |
|---|---|---|---|
| CN | 1219052 A | 6/1999 | |
| GB | 2379583 A | 3/2003 | |
| JP | 11-136308 A | 5/1999 | |
| JP | 2000-32120 A | 1/2000 | |
| JP | 2000-125026 A | 4/2000 | |
| JP | 2000-216858 A | 8/2000 | |
| JP | 2001-8270 A | 1/2001 | |
| JP | 2004-507980 A | 3/2004 | |

\* cited by examiner

*Primary Examiner* — Steve D Agosta
(74) *Attorney, Agent, or Firm* — Sughrue Mion, PLLC

(57) ABSTRACT

In a mobile telephone apparatus, an information storing section stores information, and a control section receives a remote access request signal from an external network to access the information storing section.

5 Claims, 9 Drawing Sheets

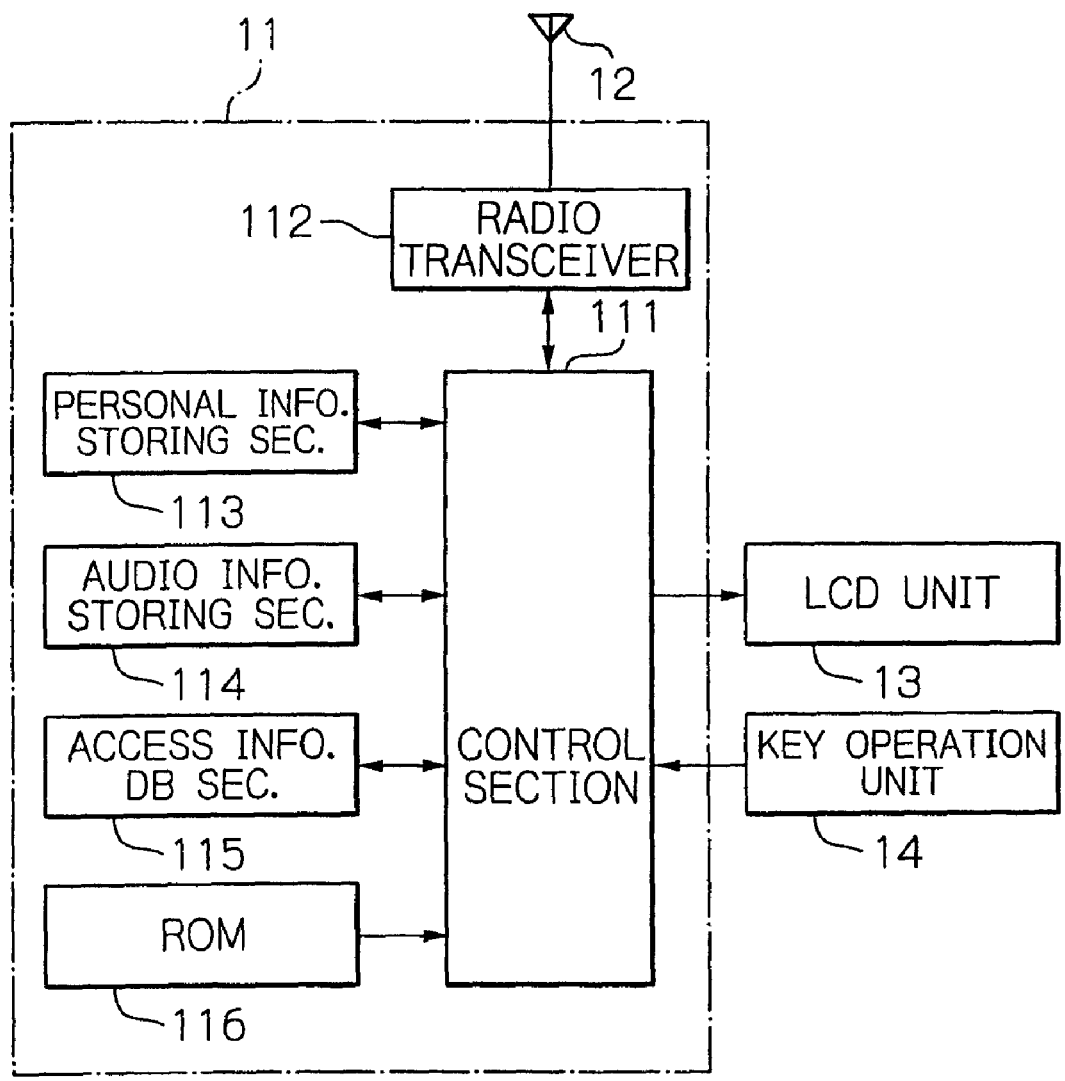

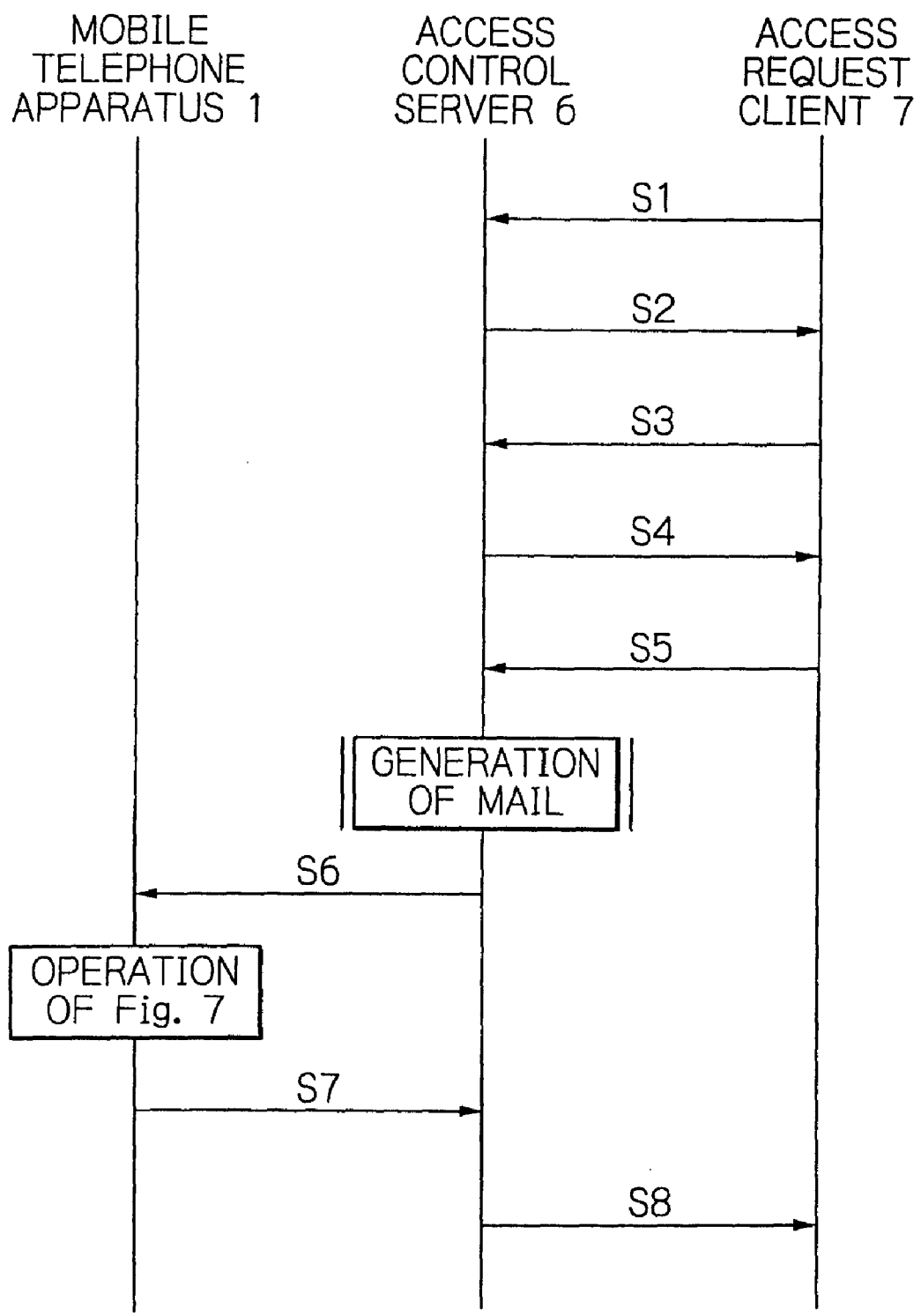

*Fig. 5A*

```
Subject : reference request
From : xxx@k-tai.com
••••••
<start>
<password> zzz
<action> reference
<object> directory
<initial> a
<end>
```

*Fig. 5B*

```
Subject : reference request
From : xxx@k-tai.com
••••••
<start>
<password> zzz
<action> reference
<object> mail
<date> today
<end>
```

*Fig. 5C*

```
Subject : reference request
From : xxx@k-tai.com
••••••
<start>
<password> zzz
<action> reference
<object> schedule
<date> today
<end>
```

Fig. 6

```
Subject : renewal request
From : xxx@k-tai.com
‥‥‥
<start>
<password> zzz
<action> answering message renewal
<object> ALI, as 1, wav
        Mr. X as 2, wav
        Ms. Y as http://k-tai.com/3. wav
<end>
‥‥‥
attached files
1. wav  2. wav
```

MOBILE TELEPHONE APPARATUS WITH REMOTE ACCESS FUNCTION FOR EXTERNAL NETWORK AND REMOTE ACCESS METHOD FOR MOBILE COMMUNICATION SYSTEM

This is a divisional of application Ser. No. 11/671,721 filed Feb. 6, 2007, which is a divisional of application Ser. No. 10/649,717 filed Aug. 28, 2003, which claims priority from Japanese Patent Application No. 2002-258361 filed Sep. 4, 2002. The entire disclosures of the prior applications, are considered part of the disclosure of the accompanying divisional application and are hereby incorporated by reference.

BACKGROUND OF THE INVENTION

1. Field of the Invention

The present invention relates to a mobile telephone apparatus with a remote access function and a remote access method for a mobile communication system.

2. Description of the Related Art

Generally, personal information such as telephone directory, mail information or schedule information is loaded in a mobile telephone apparatus, not in a personal pocket book. As a result, if there is a need to call, the owner can rapidly respond thereto by using the personal information loaded in the mobile telephone apparatus.

On the other hand, since the mobile telephone apparatus needs to be charged, the owner may forget to bring the mobile telephone apparatus. In this case, since the owner usually does not have a personal pocket book, it is impossible to obtain his or her personal information.

In order to solve the above-mentioned problem, in the prior art, a remote access method from another mobile telephone apparatus has been suggested (see: JP-A-2000-125025 & JP-A-2000-216858).

In the above-described prior art remote access method, however, since a remote access is not carried out from an external network such as the Internet, the security is not protected. Also, renewal of answering messages in an answering mode by a remote access method is not suggested. Further, obtaining of Internet contents through a mobile telephone apparatus by a remote access method is not suggested.

SUMMARY OF THE INVENTION

It is an object of the present invention to provide a mobile telephone apparatus capable of further protecting security, renewing answering messages in an answering mode and obtaining Internet contents.

Another object is to provide a remote access method for a mobile communication system including the above-mentioned mobile telephone apparatus.

According to the present invention, in a mobile telephone apparatus, an information storing section stores information, and a control section receives a remote access request signal from an external network to access the information storing section.

Also, in a remote access method for a mobile communication system comprising at least one mobile telephone apparatus, a mobile telephone network capable of communicating with the mobile telephone apparatus, an Internet connected via a gateway to the mobile telephone network, an access control server connected to the Internet, and at least one access request client connected to the Internet, a remote access request signal is transmitted from the access request client via the Internet to the access control server, and a first mail including the remote access signal is transmitted from the access control server via the Internet, the gateway and the telephone network to the mobile telephone apparatus. Then, a second mail is generated by the mobile telephone apparatus in accordance with the first mail, and the second mail is transmitted from the mobile telephone apparatus via the mobile telephone network, the gateway and the Internet to the access control server. Then, a third mail including the second mail is transmitted from the access control server to the access request client.

Further, in a remote access method for a mobile communication system comprising at least one mobile telephone apparatus, a mobile telephone network capable of communicating with the mobile telephone apparatus, an Internet connected via a gateway to the mobile telephone network, an access control server connected to the Internet, a public switched telephone network connected to the mobile telephone network, and at least one fixed telephone apparatus connected to the public switched telephone network, a connection request signal including an action number is transmitted from the fixed telephone apparatus via the public switched telephone network and the mobile telephone network to the mobile telephone apparatus. Then, it is determined whether or not a predetermined ringing time has passed. As a result, only after the predetermined ringing time has passed, is a download request signal corresponding to the action number transmitted from the mobile telephone apparatus via the mobile telephone network, the gateway and the Internet to the access control server. Then, an Internet content is transmitted from the access control server via the Internet, the gateway and the mobile telephone network to the mobile telephone apparatus, after the access control server has received the download request signal. Then, the Internet content is transmitted from the mobile telephone apparatus via the mobile telephone network and the public switched telephone network to the fixed telephone apparatus.

BRIEF DESCRIPTION OF THE DRAWINGS

The present invention will be more clearly understood from the description set forth below, with reference to the accompanying drawings, wherein:

FIG. 3 is a detailed block circuit diagram of an internal circuit of the mobile telephone unit of FIG. 2;

FIG. 4 is a sequence diagram showing a first operation of the mobile communication system of FIG. 1;

FIGS. 5A, 5B 5C and 6 are diagrams showing examples of the mail generated by the access control server of FIG. 4;

DESCRIPTION OF THE PREFERRED EMBODIMENTS

Figure 1:
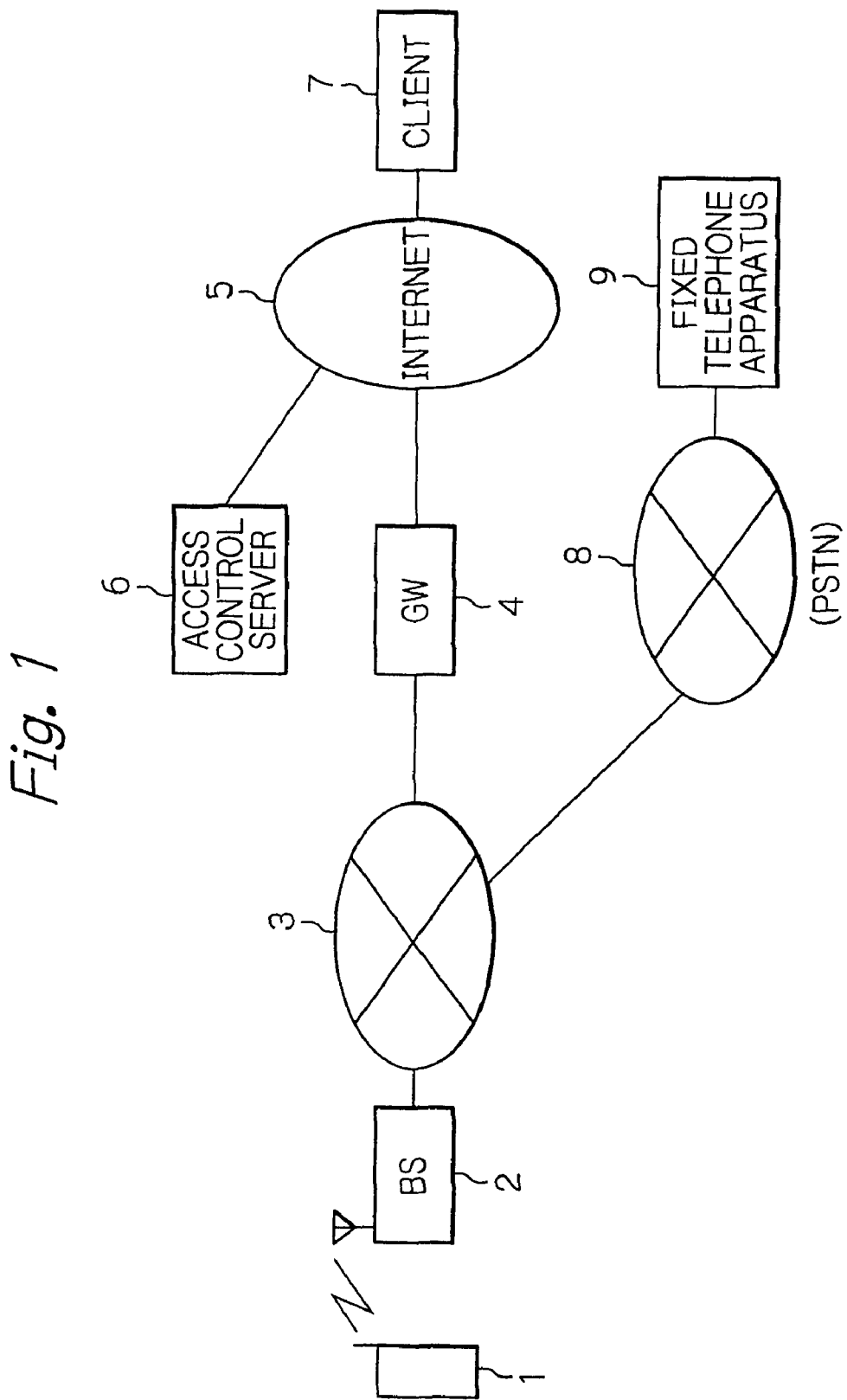
FIG. 1 is a diagram illustrating an embodiment of the mobile communication system according to the present invention.

In FIG. 1, which illustrates an embodiment of the mobile communication system according to the present invention, reference numeral 1 designates a mobile telephone apparatus, and 2 designates a base station which is connected to a mobile telephone network 3.

The mobile telephone network 3 is connected via a gateway 4 to the Internet 5. Also, an access control server 6 for performing a remote access control upon the mobile telephone apparatus 1 and an access request client 7 for accessing the mobile telephone apparatus 1 are connected to the Internet 5. For example, the access request client 7 is a personal computer, a personal digital assistant (PDA), or an information terminal installed at a store or a public institution.

Further, a public switches telephone network (PSTN) 8 connected to a fixed telephone apparatus 9 is connected to the mobile telephone network 3.

A connection between the mobile telephone apparatus 1 and the access control server 5 is carried out by a line switching call and/or a packet switching call. On the other hand, a connection between the mobile telephone apparatus 1 and the fixed telephone apparatus 9 is carried out by a line switching call.

Figure 2:
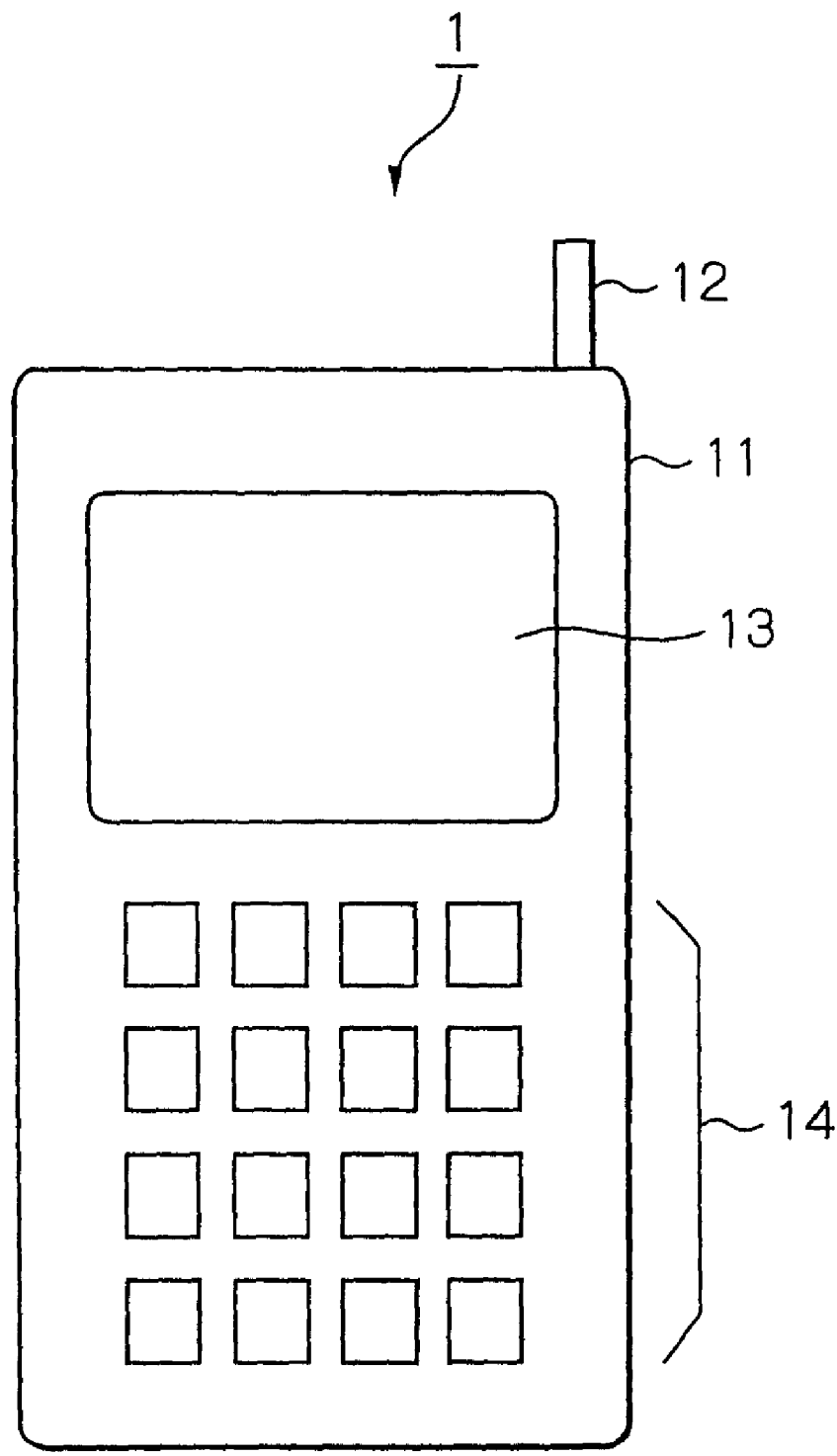
FIG. 2 is a schematic view of the mobile telephone unit of FIG. 1.

In FIG. 2, which is a schematic view of the mobile telephone apparatus of FIG. 1, the mobile telephone apparatus 1 is constructed by a housing 11, an antenna 12, a liquid crystal display (LCD) unit 13 and a key operation unit 14.

In FIG. 3, which is a block circuit diagram of an internal circuit of the housing 11 of FIG. 2, a control section 111 is provided. The control section 111 is connected via a radio transceiver section 112 to the antenna 12, and is also connected to the LCD unit 13 and the key operation unit 14.

Also, the control section 111 is connected to a personal information storing section 113, an audio information storing section 114 and an access information database section 115. The personal information storing section 113 stores personal information such as a telephone directory, mail information and schedule information. The audio information storing section 114 stores one or more answering messages in an answering mode, stores responding messages from originators in an answering mode, and Internet contents. The access information database section 115 stores a mode bit for indication of whether or not the mobile telephone apparatus is in an answering mode, a relationship table between telephone numbers of originators and answering messages, a password used in a remote access mode, and a relationship table between action numbers and operations.

The personal information storing section 113, the audio information storing section 114 and the access information database section 115 are constructed by a nonvolatile memory such as an electrically-erasable programmable read-only memory (EEPROM).

Further, the control section 111 analyses received data. As a result, if the received data indicates a control command, the control section 111 processes this control command. Also, the control section 111 generates response data using the contents of the personal information storing section 113, the audio information storing section 114 and the access information database section 115.

The control section 111 is constructed by a microcomputer which can be operated in accordance with programs stored in a read-only memory 116 which can be constructed by an EEPROM. Also, the control section 111 may have a multi-call function for simultaneously carrying out a line switching call and a packet switching call.

Figure 7:
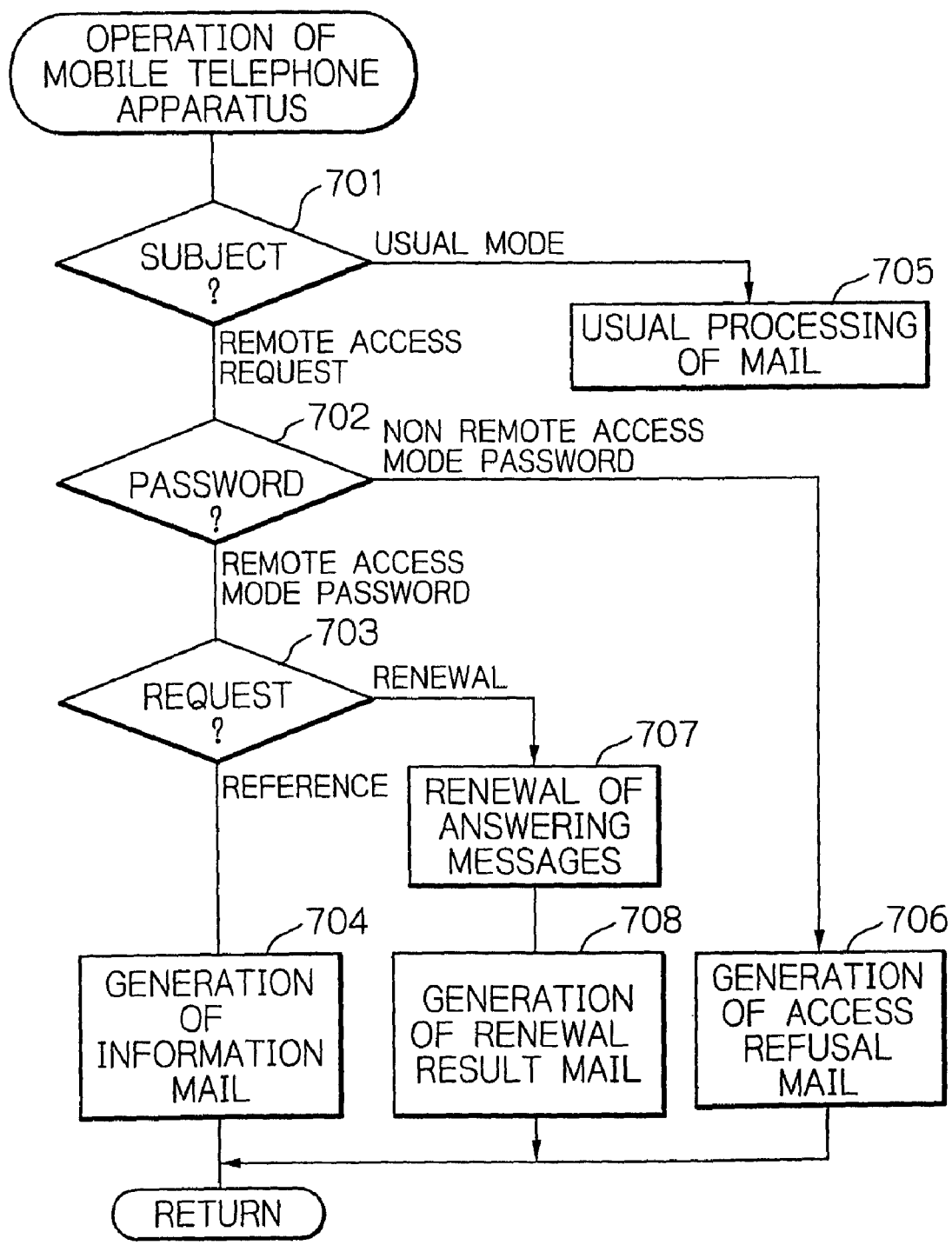
FIG. 7 is a detailed flowchart for explaining the operation of the mobile telephone apparatus of FIG. 1.

A first operation of the mobile communication system of FIG. 1 is explained next with reference to FIGS. 4, 5A, 5B, 5C, 6 and 7. Here, FIG. 4 is a sequence diagram, FIGS. 5A, 5B, 5C and 6 are diagrams showing examples of mails generated by the access control server 6 in FIG. 4, and FIG. 7 is a detailed flowchart for explaining the operation of the mobile telephone apparatus in FIG. 4.

First, the access request client 7 transmits a connection request signal S1 via the Internet 5 to the homepage of the access control server 6. As a result, the access control server 6 transmits an authentication request signal S2 to the access request client 7, in order to protect security.

Next, the access request client 7 transmits a password signal S3 to the access control server 6. As a result, only when the password signal S3 is satisfactory, does the access control server 6 transmit a connection permission signal S4 to the access request client 7, so that the access request client 7 can access the homepage of the access control server 6.

Next, the access request client 7 transmits a request signal S5 to the access control server 6 with reference to the homepage thereof. As a result, the access control server 6 generates a mail addressed to the mobile telephone apparatus 1 in accordance with the request signal S5. For example, if the request signal S5 indicates a reference request for the telephone directory, the mail is as shown in FIG. 5A. Also, if the request signal S5 indicates a reference request for the mail information, the mail is as shown in FIG. 5B. Further, if the request signal S5 indicates a reference request for the schedule, the mail is as shown in FIG. 5C. Additionally, if the request signal S5 indicates a renewal request for answering messages, the mail is as shown in FIG. 6.

Next, the access control server 6 transmits the mail as shown in FIG. 5A, 5B, 5C or 6 to the mobile telephone apparatus 1. Note that this mail can be transmitted by using a short message service which includes a telephone number of the access request client 7, in order to further protect security.

Next, upon receipt of the mail from the access control server 6, the mobile telephone apparatus 1, i.e., the control section 111 carries out an operation as shown in FIG. 7 which will be explained below.

The flowchart of FIG. 7 is started when the radio transceiver section 112 has received a mail.

At step 701, the mail is transmitted from the antenna 12 via the radio transceiver section 112 to the control section 111 which determines whether or not the mail is directed to a remote access request in accordance with the content of "Subject" of the mail. As a result, only when the mail is directed to a remote access request such as "reference request" or "renewal request", does the control proceed to step 702. Otherwise, the control proceeds to step 705 in which the control section 111 carries out a usual mail processing.

At step 702, the control section 111 determines whether or not the password coincides with the remote access mode password stored in the access information database section 115. As a result, only when the password of the mail coincides with the remote access mode password, does the control proceed to step 703. Otherwise, the control proceeds to step 706 which generates an access refusal mail.

At step 703, the control section 111 determines whether the mail is directed to a reference request or a renewal request in accordance with the content of "Subject" of the mail. As a result, when the mail is directed to a reference request, the control proceeds to step 704. On the other hand, when the mail is directed to a renewal request, the control proceeds to 707.

At step 704, the control section 111 reads information from the personal information storing section 113 in accordance with the "object" and the like of the mail. For example, if the mail is as shown in FIG. 5A, the control section 111 reads name information of the telephone directory having initial "a" from the personal information storing section 113. If the mail is as shown in FIG. 5B, the control section 111 reads mail information having the data "today" from the personal information storing section 113. If the mail is as shown in FIG. 5C, the control section 111 reads the schedule information having the data "today" from the personal information storing section 113. As a result, the control 111 generates a mail including the name information, the mail information or the schedule information.

At step 707, the control section 111 renews the corresponding answering messages stored in the audio information storing section 114. Also, the control section 111 renews the relationship between telephone numbers of originators and answering messages stored in the access information database section 116. For example, one renewed answering message is "I left this telephone apparatus at home, so I cannot use it all day long".

Next, at step 708 the control section 111 generates a mail on renewal result.

The control at steps 704, 706 and 708 returns to FIG. 4.

The control section 111 transmits a signal S7 including the mail generated at step 704, 706 or 708 of FIG. 7 to the access control server 6.

Finally, the access control server 6 transmits a signal S8 including the mail generated at step 704, 706 or 708 of FIG. 7 to the access request client 7.

Thus, according to the above-described first operation, the access request client 7 can access personal information such as the telephone directory, the mail and the schedule stored in the personal information storing section 113. Also, the access request client 7 can renew answering messages stored in the audio information storing section 114.

A second operation of the mobile communication system of FIG. 1 is explained next with reference to FIG. 8.

First, the fixed telephone apparatus 9 transmits a connection request signal S11 including an action number "01234567890" to the mobile telephone apparatus 1.

Next, at step 801, in the mobile telephone apparatus 1, the control section 111 retrieves an operation in the access information database section 115 using the action number "01234567890". In this case, the operation is to regenerate Internet contents such as audio data, stationary or moving picture data from the Internet 5.

Next, at step 802, the control section 111 determines whether or not a ringing time has passed. If the mobile telephone apparatus 1 is responded to before the ringing time has passed, the control proceeds to step 803 which carries out a usual speech processing. On the other hand, if the ringing time has passed, the control proceeds to step 804 which carries out an answering operation.

Next, the mobile telephone apparatus 1 transmits a download request signal S12 for downloading the Internet content, corresponding to the operation retrieved at step 801, to the access control server 6. In this case, the mobile telephone apparatus 1 uses the multi-call function to access the access control server 6 by a packet switching call.

Next, the access control server 6 generates a download signal S13, so that the above-mentioned Internet content is downloaded from the access control server 6 to the mobile telephone apparatus 1 where the control section 111 stores the Internet content in the audio information storing section 114.

Next, the control section 111 transmits an Internet content signal S14 in the audio information storing section 114 to the fixed telephone apparatus 9.

Next, the control section 111 transmits a message request signal S15 to the fixed telephone apparatus 1. As a result, the fixed telephone apparatus 9 transmits a message signal S16 to the control section 111, so that the message signal S16 is stored in the audio information storing section 114.

Finally, the fixed telephone apparatus 9 transmits a disconnection request signal S17 to the control section 111, so that the control section 111 stops the storing operation of the audio information storing section 114.

Thus, according to the above-described second operation, the fixed telephone apparatus 9 can access Internet contents.

Figure 8:
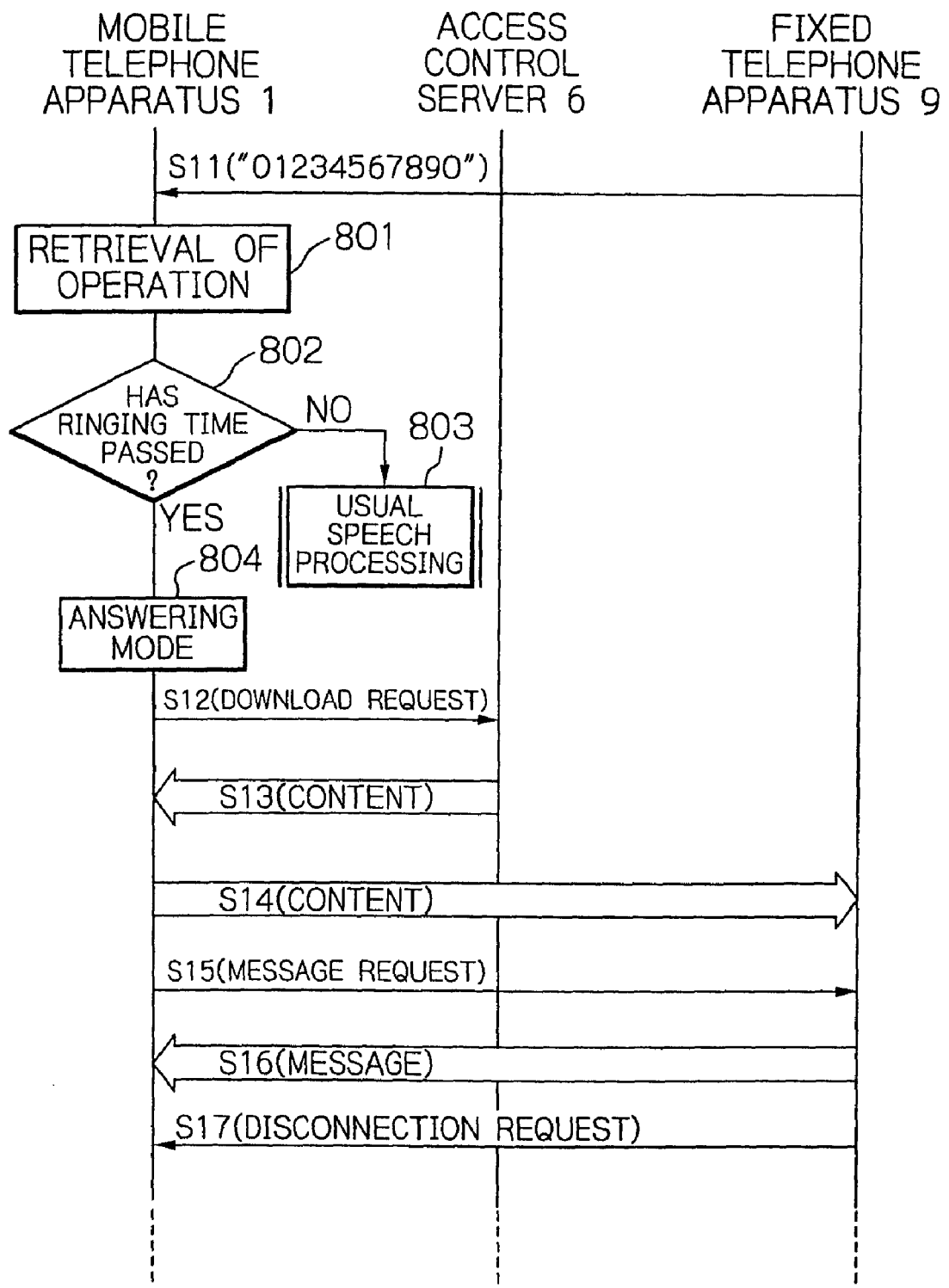
FIG. 8 is a sequence diagram showing a second operation of the mobile communication system of FIG. 1.
Figure 9:
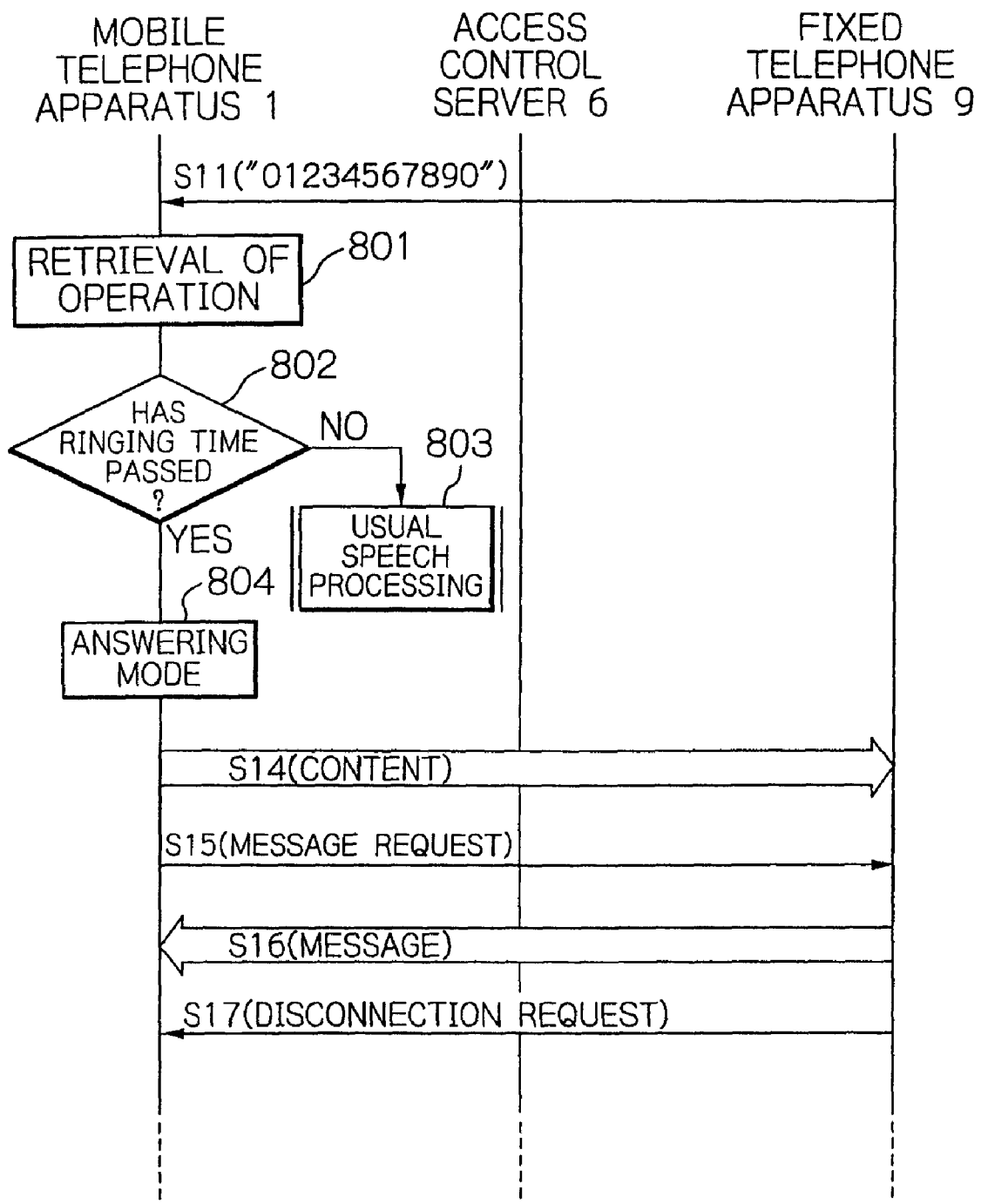
FIG. 9 is a sequence diagram illustrating a modification of the sequence diagram of FIG. 8.

In FIG. 9, which illustrates a modification of FIG. 8, if the Internet content retrieved at step 801 is already stored in the audio information storing section 114, the transmission of the download request signal S12 and the transmission of the Internet content signal S14 of FIG. 8 are omitted.

As explained hereinabove, according to the present invention, since information stored in a mobile telephone apparatus is remotely accessed through an external network such as the Internet, the information can be referred to and renewed while protecting security. Also, contents of an external network such as the Internet can be obtained through a mobile telephone apparatus.

The invention claimed is:

1. A remote access method for a mobile communication system comprising at least one mobile telephone apparatus, a mobile telephone network capable of communicating with said mobile telephone apparatus, an Internet connected via a gateway to said mobile telephone network, an access control server connected to said Internet, and at least one access request client connected to said Internet, comprising the steps of:

transmitting a remote access request signal from said access request client via said Internet to said access control server;

transmitting a first mail including said remote access signal from said access control server via said Internet, said gateway and said mobile telephone network to said mobile telephone apparatus;

generating a second mail by said mobile telephone apparatus in accordance with said first mail;

transmitting said second mail from said mobile telephone apparatus via said mobile telephone network, said gateway and said Internet to said access control server; and transmitting a third mail including said second mail from said access control server to said access request client, wherein said generating said second mail comprises:

determining whether said first mail is directed to a reference request or a renewal request based on content of a subject line of said first mail;

generating said second mail including personal information of said mobile telephone apparatus in response to said first mail being directed to said reference request according to said determining; and generating said second mail including a renewed result of answering messages in an answering mode in response to said first mail being directed to said renewal request according to said determining, wherein said renewal request renews a relationship between a telephone number of an originator and an answering message to respond to the originator, stored in said mobile telephone apparatus.

2. The remote access method as set forth in claim 1, wherein said personal information includes at least one of a telephone directory, mail information and schedule information.

3. The remote access method as set forth in claim 1, wherein said second mail includes an access refusal mail.

4. The remote access method as set forth in claim 1, wherein said transmitting said first mail comprises transmitting said first mail from said access control server via said Internet, said gateway and said mobile telephone network using a short message service to said mobile telephone apparatus.

5. The remote access method as set forth in claim 1, wherein said generating said second mail further comprises:
   determining whether said first mail is directed to a remote access request based on content of a subject line of said first mail; and
   generating second mail by said mobile telephone apparatus in accordance with said first mail according to said determining.

* * * * *